B. F. GREGORY AND W. H. CRAUN.
FRONT WHEEL DRIVE FOR AUTOMOBILES.
APPLICATION FILED JUNE 16, 1919.
1,361,047.
Patented Dec. 7, 1920.
3 SHEETS—SHEET 3.
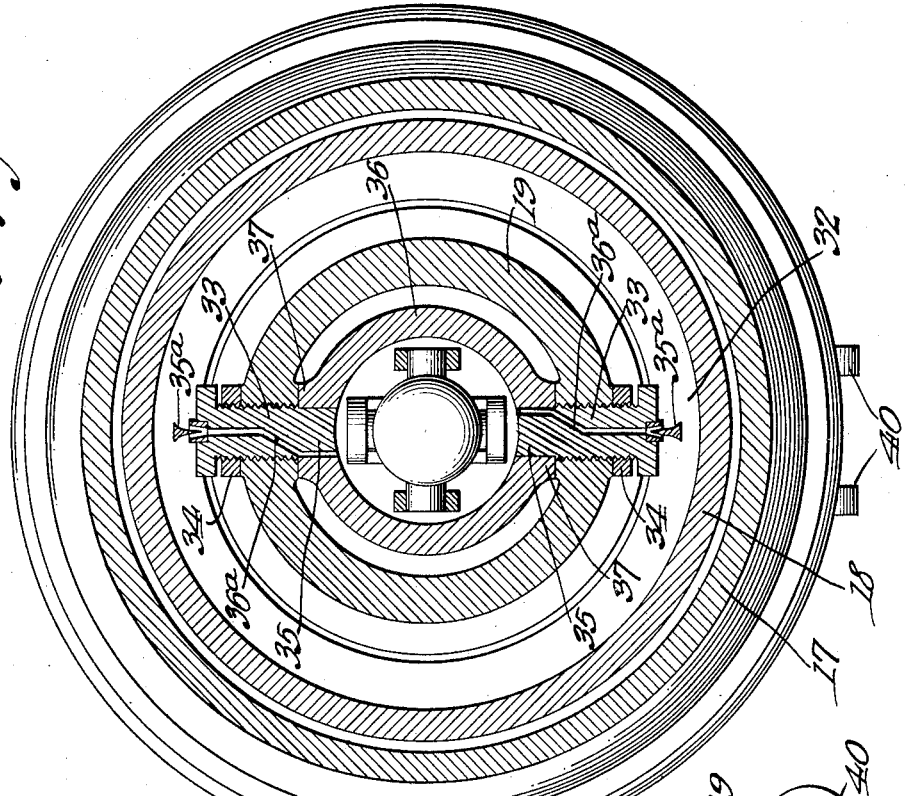
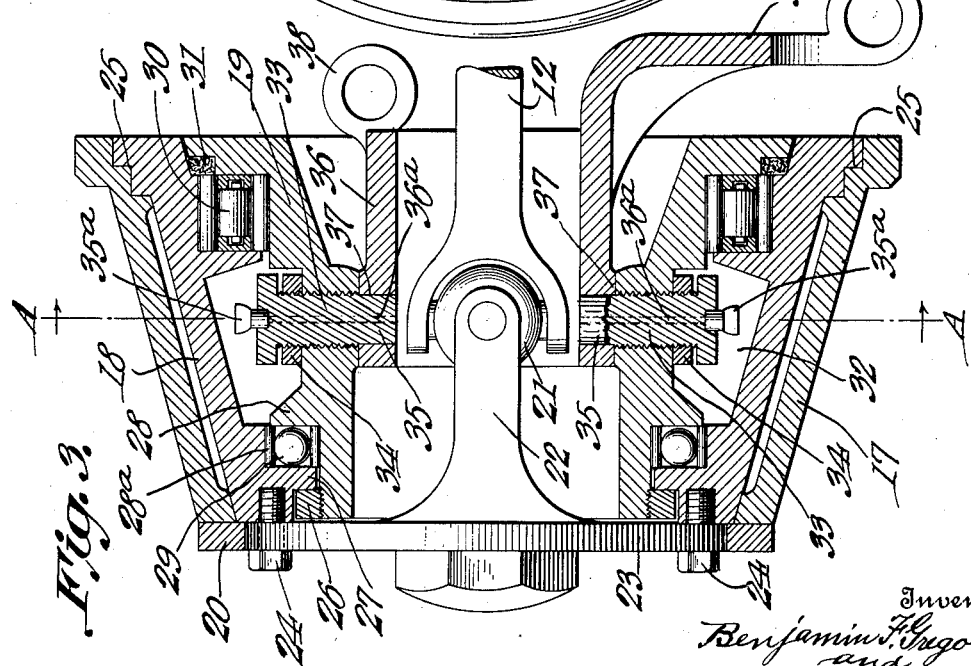
Inventors
Benjamin F. Gregory
and
William H. Craun
By C. F. Bell
Attorney

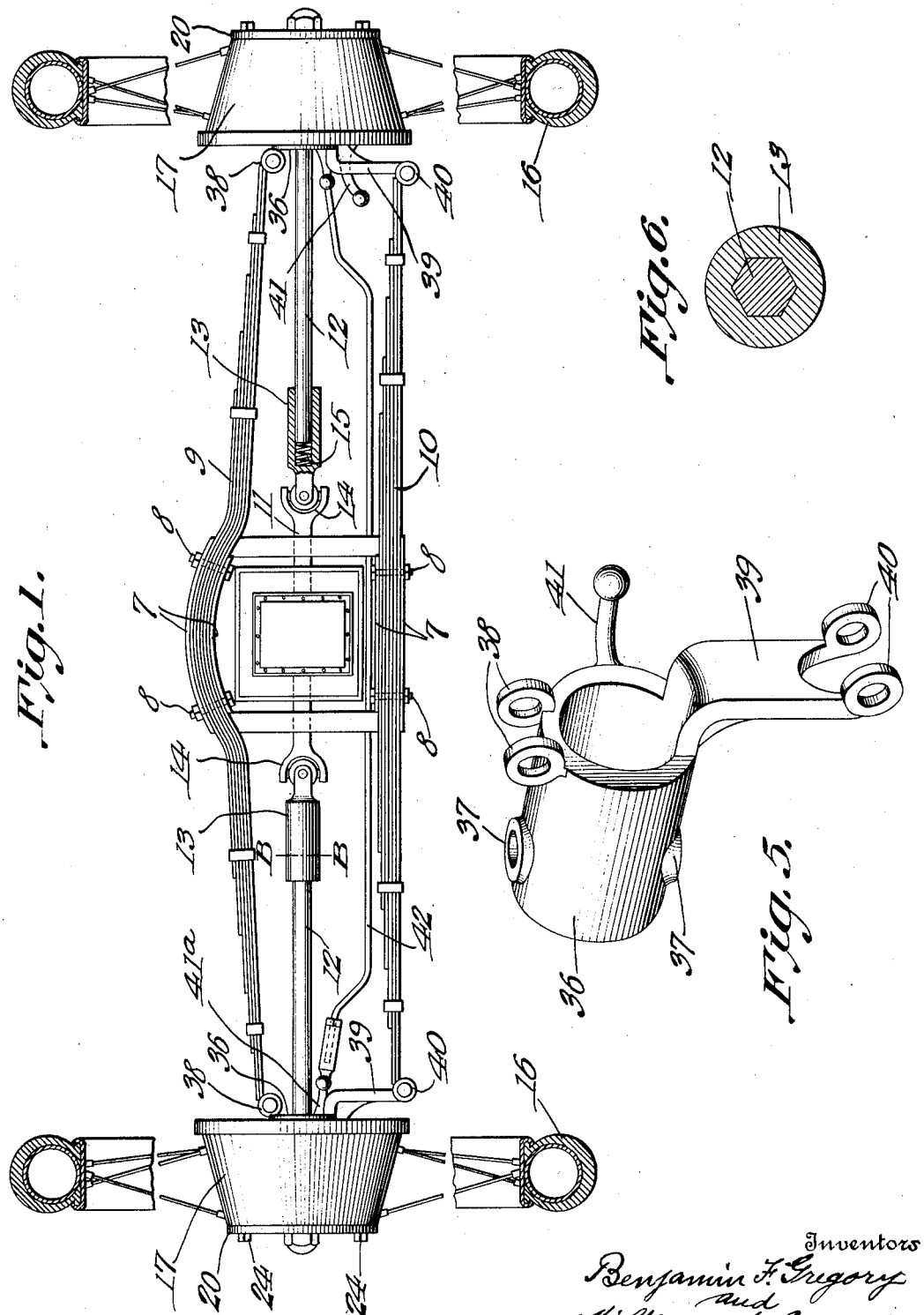
B. F. GREGORY AND W. H. CRAUN.
FRONT WHEEL DRIVE FOR AUTOMOBILES.
APPLICATION FILED JUNE 16, 1919.
1,361,047. Patented Dec. 7, 1920.
3 SHEETS—SHEET 1.
Inventors
Benjamin F. Gregory
and
William H. Craun
By C. F. Belt
Attorney

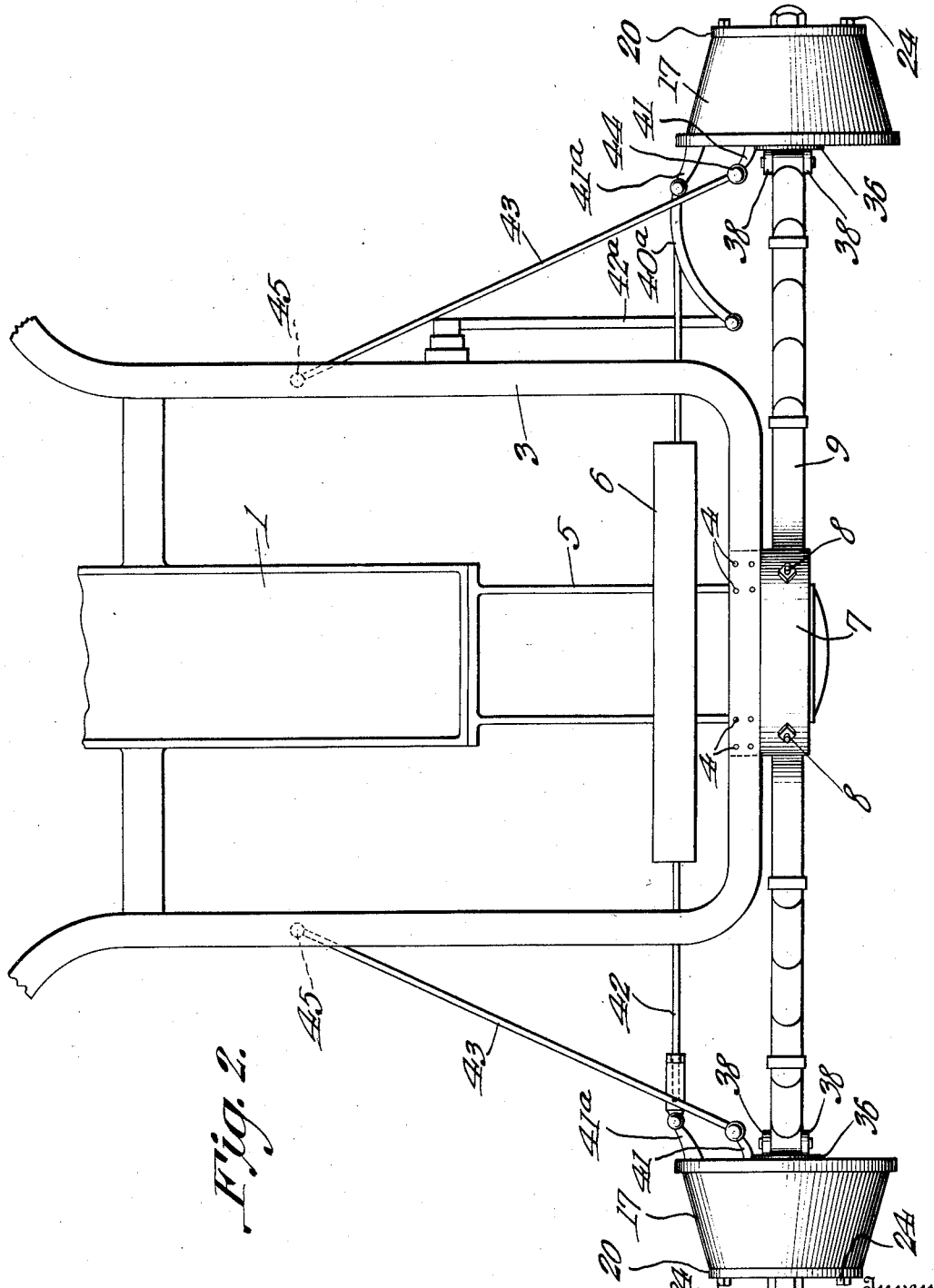

UNITED STATES PATENT OFFICE.

BENJAMIN F. GREGORY AND WILLIAM H. CRAUN, OF HOBOKEN, NEW JERSEY.

FRONT-WHEEL DRIVE FOR AUTOMOBILES.

1,361,047.  Specification of Letters Patent.  Patented Dec. 7, 1920.

Application filed June 16, 1919. Serial No. 304,375.

*To all whom it may concern:*

Be it known that we, BENJAMIN F. GREGORY and WILLIAM H. CRAUN, citizens of the United States, residing at Hoboken, in the county of Hudson and State of New Jersey, have invented certain new and useful Improvements in Front-Wheel Drives for Automobiles, of which the following is a specification.

This invention relates to automobile gearing, front frames, spring connections and front wheel hub construction, and pertains especially to arrangements and combinations of said parts and their connections and attachments for front drive operations.

The prime object of the invention is to provide, in a motor vehicle, such construction in the front wheel hubs and in the driving connection therewith, as to afford novel and simple means for mounting the ends of a driven shaft within said hubs central of the tire tread of such wheels.

A further object of the invention is to provide such construction and arrangement in front wheel hubs of automobiles as to afford means for connecting the front springs with a certain hub member, and means for connecting a driven shaft with another coöperating hub member.

A still further object of the invention is to provide front wheel hubs embodying a revoluble outer hub member, a non-revoluble inner hub member within the said outer member, and springs attached to and preventing revolution of the inner hub member and affording means for mounting a casing containing a motor, clutch transmission and differential gearing.

A still further object of the invention is to provide front wheel inner hub members connected by a pair of springs which hold said members fixed within outer hub members, and to furnish novel and peculiar devices connecting the ends of a driven shaft extending centrally between the springs of said pair with the outer hub members for revolving the latter.

Various other objects, advantages, and improved results are attainable by reason of the construction and combinations hereinafter disclosed.

In the accompanying drawings forming part of this application:

Figure 1 is a front elevation partly broken away.

Fig. 2 is a top plan view partly broken away.

Fig. 3 is a detail transverse sectional view of one of the front wheel hub members showing part of the driven shaft in elevation.

Fig. 4 is a cross section taken on the dotted line A—A Fig. 3.

Fig. 5 is a perspective view of one of the connections between the inner hub member and the transverse springs.

Fig. 6 is a cross section taken on the dotted line B—B Fig. 1.

The same reference characters denote the same parts throughout the several views of the drawings.

In carrying out our invention, we house the driving mechanism, such as a motor, clutch, transmission and differential, in a casing 1, having lateral arms attached to and supported by a front frame extension 3 to which is riveted or otherwise secured as at 4 the front end of a frame extension 5 of the casing 1, and this frame 5 may support a radiator base 6. The front end of the frame 5 has flanges 7 between which transverse plate springs are bolted as at 8. The upper transverse spring 9 is bowed centrally to fit the convexed top of the frame 5 between the flanges 7, and the lower or companion transverse spring 10 fits in a straight flat surface of the bottom of the frame 5 between the flanges 7. This arrangement of said frames avoids the use of the usual supplemental front frames in common use, and affords means for assembling the power units under the hoods of automobiles.

The ends of the motor driven shaft 11 are connected with the inner end of the front wheel driving axle members 12 by means of socket members 13 and universal couplings 14. The members 13 permit lengthwise movement of the axles 12, and the latter are cushioned by spiral springs 15 contained in said socket members 13. The axle members 12 extend lengthwise centrally under the upper spring 9 and centrally between this spring and its companion spring 10, by reason of the driven shaft 11 have the same centralized position, as clearly shown in Figs. 1 and 2 of the drawings. The said cushioning device for the axle shafts or members 12 also affords means for taking up any lost motion which may develop in lengthwise movement of these axle members.

In order to carry out another essential feature of our invention, i. e., mounting the front wheels as 16 so as to be driven by the axle members 12, locating and holding the outer end of these members central of said wheels, fixing non-revoluble devices within the wheel hub shell 17, and connecting such devices with the springs 9 and 10, we provide each front wheel with a pair of hub members 18 and 19, but will only describe in detail said members and their connections as applied to one of the front wheels, said members and their connections being the same for the other front wheel. The revoluble hub member 18 has the hub shell 17 secured thereon by means of the usual clamping ring 20, and said hub member 18 is connected with the outer end of the shaft members 12 by a universal joint 21 to which is coupled a steel axle 22 projecting inwardly from the ring 20 secured to the outer face of the revoluble hub member 18 by a plurality of set bolts 24. The member 18 has step shoulders 25 against which the hub shell 17 is secured by the locking ring 20. The non-revoluble hub member 19 is contained within the revoluble hub member 18, and the member 19 is held within the member 18 by means of a ring 26 screwing to the periphery of the outer end of the member 19 and abutting against an annular flange 27 on the member 18. The flange 27 and a flange 28 projecting from the member 19 retain roller bearings 28ª and ball bearings 29 for and between the members 18 and 19, and similar roller bearings 30 are housed adjacent to the rear face of the said hub members. A dust proof ring 31, preferably of suitable felt, is provided to protect these last mentioned roller bearings, and all of said bearings are lubricated by a body of light weight grease adapted to be contained in the chamber 32 formed by and between the hub members 18 and 19. Obviously this construction and arrangement permits the outer hub member 18 to be revolved, with the wheel shell or hub member 17, around the inner hub member 19 which is fixed in non-revoluble position, as now to be explained. Two master pins 33 are secured in the hub member 19 by means of lock nuts 34 and have a trunion end 35 projecting centrally from the inner periphery of the member 19 opposite the universal joint or axle couplings 21, and a tubular connection 36 is mounted on said pins 33 by means of a pair of opposite trunnion bearings 37 on the outer end of the connection 36. The said trunnions are lubricated by means of cup shaped dippers 35ª projecting from the master pins 33 for collecting oil from the lubricating grease contained in space 32 and feeding the same to the trunnions through a duct 36ª in the pins 33, during the revolution of the hub member 18, thus avoiding the use of the usual grease cups and other oiling devices.

The inner end of the connection 36 is provided with projecting bearings 38 to which the ends of the upper spring 9 are attached and this end of the tube or connection 36 has a depending arm 39 terminating in a pair of bearings 40 to which the ends of the lower spring 10 are attached. This end of the tube 36 also has a projection 41 to which one end of strut rods 43 is attached, and the members 19 have an arm 41ª connected with a steering gear by members 40ª and 42ª, and the members 19 are connected by a tie rod 42. The strut-rods 43 connect the tube members 36 with the sides of the frame 3, by ball and socket joints 44 and 45. The members 19 have a projection 41ª to which is attached a tie rod 42 for connecting them. Obviously this rod rigidly connects the two front hub members 18 and 19 so as to thoroughly brace all of these parts and permit the front wheels to be moved in unison in steering operations.

It will be seen that the tube 36 and its several bearing attachments constitute a substantial mounting for the hub members, afford means for suspending the transverse spring ends, and permit the connection of the outer end of the axle members to be made centrally in the hub members without interfering with the swinging movement of the hub members in steering operations, and without interfering with the revolution of the wheels and their hub members.

Obviously our arrangement and connection of the front frame and transverse springs is such that the axle members are driven centrally between the spirngs, and by reason of the latter being supported by the tubular connection within the hub members, and said tubular connection permitting only lateral movement of the inner hub member to which it is pivoted centrally, the wheels are free to be revolved by the stub axles as driven by the axle members.

We do not wish to be understood as confining our invention as to size and material nor to its application to any particular automobile or motor vehicle, neither do we wish to limit the particular shape or design of any of the parts of our invention, but reserve the right to make such changes and variations in the whole and in the parts thereof in manufacture and practical application as may not be inconsistent with the appended claims.

Having thus described our invention what we claim as new and desire to secure by Letters Patent is:

1. In connecting the front wheels of automobiles with a motor frame, a motor driven shaft, a revoluble wheel hub member, a non-revoluble wheel hub member contained within said revoluble member, a pair of springs secured centrally to the frame, a tubular member trunnioned to the non-revoluble member for connecting the ends of the springs with the non-revoluble hub member, a two part wheel axle extending lengthwise centrally between the springs and having slidable ends, means for connecting said axle parts with the revoluble hub member, and means for connecting said parts with the motor shaft.

2. In connecting the front wheels of automobiles with a motor frame, a motor driven shaft, a revoluble wheel hub member, a non-revoluble wheel hub member contained within said revoluble member, a pair of springs secured centrally to the frame one above and the other below the frame, means connecting the ends of the springs with the non-revoluble hub member, a two part wheel axle extending lengthwise centrally between the springs, means for connecting said axle parts with the motor shaft, and a tubular device trunnioned centrally within the non-revoluble hub member and having a pair of projections for connecting this member with the springs.

3. A pair of parallel springs extending across and secured to the top and bottom of an automobile frame for suspending the frame, revoluble wheel hub members, non-revoluble hub members, a tubular device trunnioned to and within the non-revoluble members and having means for attaching the ends of the upper spring, and an arm depending from said device and having means for attaching the ends of the bottom spring, whereby the non-revoluble members are connected.

4. A front frame for automobiles, a pair of frame suspending springs attached centrally to the frame, a front wheel hub member, a pair of trunnions projecting from the inner periphery of said member, a coupling having bearings for the trunnions, and a plurality of bearings projecting from the inner end of said coupling and having the ends of the said springs attached to certain of these bearings.

5. The combination of the front frame having top and bottom flanges, springs secured to and between the flanges and projecting laterally from the frame, a non-revoluble front wheel hub member, a coupling trunnioned on and within said member and having projections to which the ends of the springs are secured, a tie rod, and a projection on the non-revoluble member to which the ends of the tie rod are secured.

In witness whereof we hereunto set our hands in the presence of two witnesses.

SGT. BENJAMIN F. GREGORY.
WILLIAM H. CRAUN.

Witnesses:
  FRANCIS J. ROSS,
  HERMAN KATZ.